Aug. 9, 1927.
C. H. STRUPE
SNARE DRUM
Filed Oct. 15, 1923
1,638,106
2 Sheets-Sheet 1
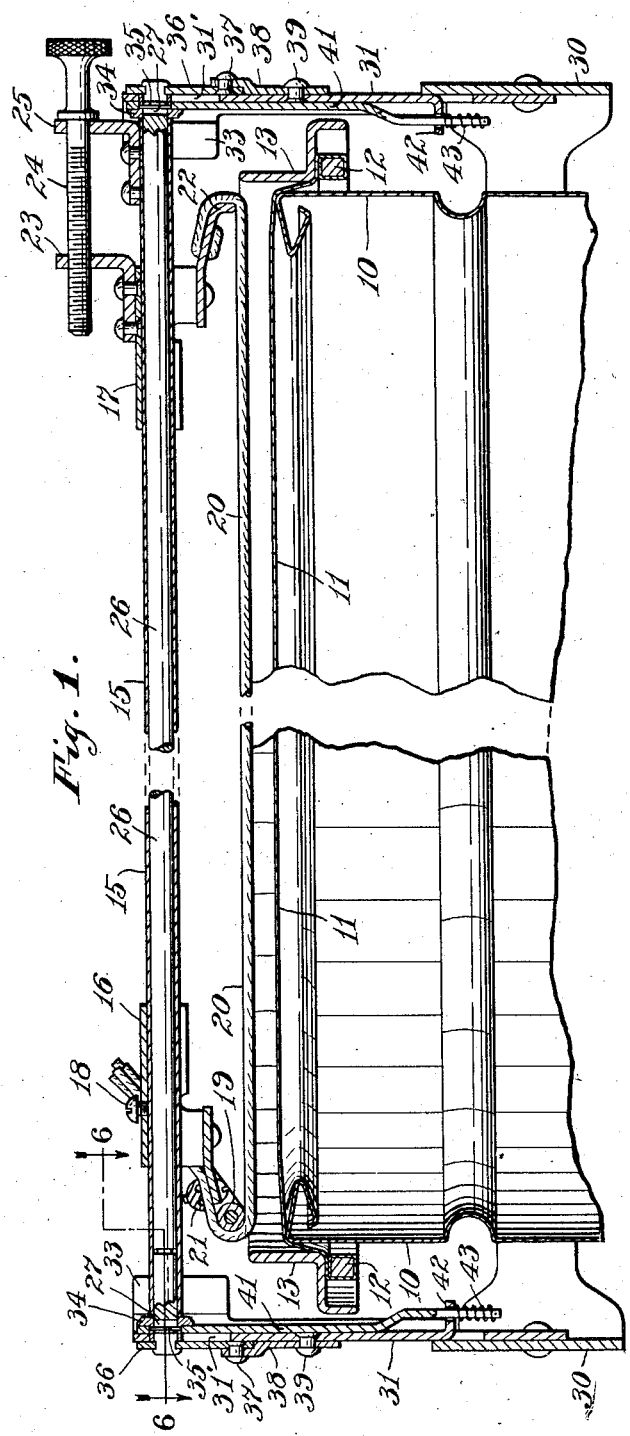
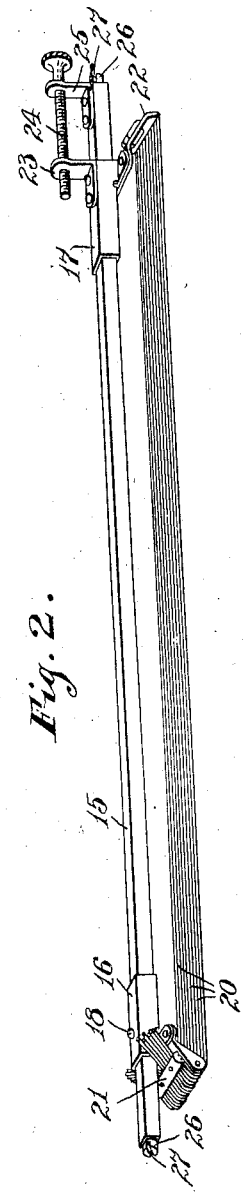
INVENTOR
Cecil H. Strupe,
BY
Arthur M. Hood.
ATTORNEY Aug. 9, 1927.
C. H. STRUPE
SNARE DRUM
Filed Oct. 15, 1923
1,638,106
2 Sheets-Sheet 2
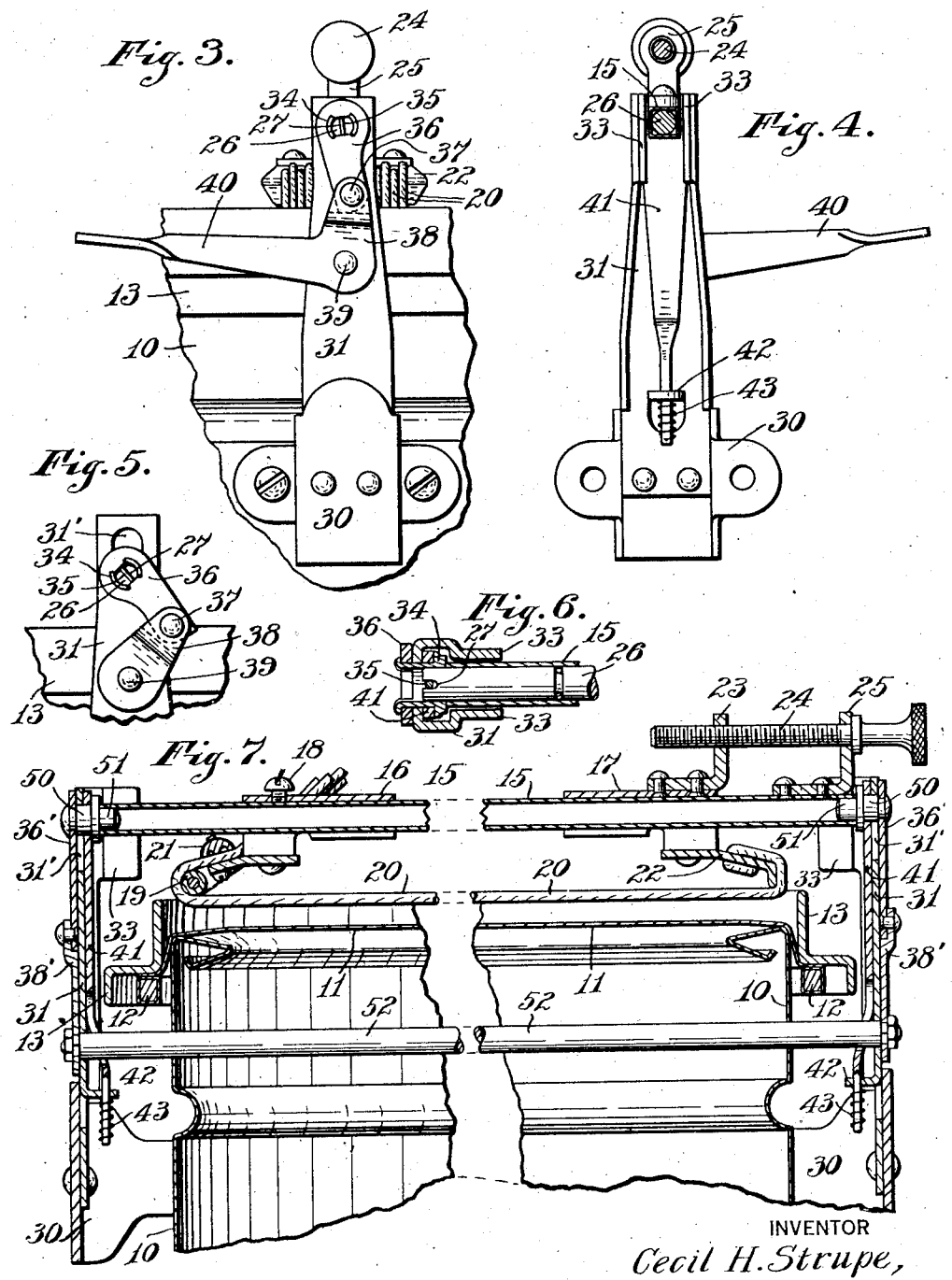
INVENTOR
Cecil H. Strupe,
BY
Arthur M. Hood.
ATTORNEY Patented Aug. 9, 1927.

1,638,106

UNITED STATES PATENT OFFICE.

CECIL H. STRUPE, OF INDIANAPOLIS, INDIANA, ASSIGNOR TO LEEDY MANUFACTURING COMPANY, OF INDIANAPOLIS, INDIANA, A CORPORATION OF INDIANA.

SNARE DRUM.

Application filed October 15, 1923. Serial No. 668,455.

The object of my present invention is to produce a support for the snares of snare drums of such character that the snares may be shifted bodily to and from the head without modifying the adjusted tension thereof, and also such that the snare carrier may be bodily removed from the drum so that any one of a series of snares may be readily substituted.

The accompanying drawings illustrate my invention. Fig. 1 is an axial section of my improvement; Fig. 2 is a perspective view of one of the snare carriers; Fig. 3 an end elevation of the carrier; Fig. 4 a fragmentary section showing the inner face of one of the supporting arms and adjacent parts; Fig. 5 a fragmentary end elevation of one of the toggle joints; Fig. 6 a fragmentary section on line 6—6 of Fig. 1; and Fig. 7 an axial section of another embodiment of my invention.

In Figs. 1 to 6, inclusive, 10 indicates the shell of the drum, 11 the drumhead, 12 the flesh ring, and 13 the head ring, these parts being of standard or any desired construction.

The snare unit comprises a carrier bar 15, upon which are slidably mounted two brackets 16 and 17, the bracket 16 being held in any desired position by means of a set screw 18 and provided with a roller 19 over which the snares 20 are passed, the snares at this end being clamped upon the bracket by means of a clamp 21. The bracket 17 is provided with a crossbar 22, to which the snares are attached. Bracket 17 is provided with a threaded finger 23 through which is threaded the tensioning screw 24, said screw being journaled in a finger 25 secured to bar 15, the arrangement being such that any desired tensioning in the snares may be obtained by an adjustment of screw 24.

Journaled within bar 15 is a shaft 26 the ends of which project slightly from the ends of the bar and these ends are diametrically slotted at 27.

Secured to shell 10 at diametrically opposite points are brackets 30, each of which is provided with a portion 31 lying substantially parallel with the drum shell and having sufficient elasticity to permit slight lateral displacement for a purpose which will appear, and at their free ends are provided with a pair of parallel, inwardly projecting flanges 33 which are spaced apart to permit the insertion of bar 15 so as to form guides for said bar. Opposite the flanges 33, part 31 is slotted at 31' and mounted in each slot, so as to be free to slide and rotate therein, is a bushing 34 provided with a diametrical pin 35 adapted to be received in one of the slots 27. Secured to the outer end of each bushing 34 is a toggle link 36 so secured to the bushing that said bushing will be rotated by the link. Pivotally connected to the end of link 36 at 37 is another toggle link 38 pivoted at 39 to part 31. One, or both, of the links 38 is provided with an operating arm, or finger piece, 40.

Journaled on each bushing 34 is a bar 41 which extends down alongside the inner face of part 31 and is projected through a finger 42 struck up from part 31, a light spring 43 engaging finger 42 and bar 41 to urge the same in a direction to hold the snares 20 against head 11.

In operation, manipulation of finger piece 40 in one direction to straighten the toggle 36—38 serves to move the snares bodily from the head 11, without, however, varying the tension of said snares, and the snares will be held in this position against the action of springs 43. When the finger piece 40 is moved in the opposite direction, the springs 43 will move the snares 20 into engagement with head 11 and hold the same in engagement therewith under the desired pressure. A swinging movement of either one of the links 36 will cause rotation of shaft 26 and a consequent synchronous movement of the toggle at the other end of the shaft.

By springing the free end of either part 31 slightly outwardly, the snare unit, shown in Fig. 2, may be readily detached and another unit carrying a different set of snares may be readily substituted.

In the construction shown in Fig. 7, the parts 10, 11, 12, 13, 15, 16, 17, 18, 19, 20, 21, 22, 23, 24, 25, 30, 31, 31', 33, 41, 42 and 43 are the same as already described.

Instead of the bushing 35, I provide a pin 50, which is mounted in slot 31' and provided with a cylindrical end 51 adapted to be received in the adjacent end of bar 15, the arm 41 being journaled thereon and toggle link 36' being journaled on or secured to the outer end of pin 50. Pivoted to the outer end of each toggle link 36' is a toggle link 38', one, or both, of which may be provided with a finger piece similar to the finger piece 40.

Extending diametrically through the drum shell 10, and journaled at its ends in parts 31 is a shaft 52, to the ends of which are secured the toggle links 38' so as to oscillate therewith, the shaft 52 thus forming an abutment for the two toggles 36'—38'.

I claim as my invention:

1. The combination with a drum, of a pair of supports carried by the drum shell, an external bar extending across the drum head between said supports, a single means carried by the drum shell by which said bar may be readily shifted bodily on the supports toward and from the drum head substantially at right angles thereto, and relatively adjustable snare-carrying elements carried by said bar.

2. The combination with a drum, of a pair of supports carried by the drum shell, an external bar extending across the drum head between said supports, a single means by which said bar may be readily shifted bodily on the supports toward and from the drum head substantially at right angles thereto, and snare-carrying elements carried by said bar.

3. The combination with a drum, of a pair of supports carried by the drum shell, an external bar extending across the drum head between said supports, a pair of toggle links mounted upon said supports and connected to said bar, means connecting said toggles for simultaneous movement thereof to shift the bar bodily toward and from the drum head substantially at right angles thereto, and snare-carrying elements carried by said bar.

4. The combination with a drum, of a pair of supports carried by the drum shell, one of said supports being laterally displaceable, an external bar extending across the drum head between said supports, snare-carrying elements carried by said bar, bar supports carried by the first-mentioned supports and separably engaging said bar, and a single means by which said bar supports may be moved toward and from the plane of the drum head.

5. The combination with a drum, of a pair of supports carried by the drum shell, an external bar extending across the drum head between said supports, snare-carrying elements carried by said bar, bar supports carried by the first-mentioned supports and separably engaging said bar, and a single means by which said bar supports may be moved toward and from the plane of the drum head.

6. The combination with a drum, of a pair of supports carried by the drum shell, one of said supports being laterally displaceable, an external bar extending across the drum head between said supports, snare-carrying elements carried by said bar, bar supports carried by the first mentioned supports and separably engaging said bar, and a single means by which said bar supports may be moved toward and from the plane of the drum head, said means comprising two toggles each connected to one of the first-mentioned supports and to one of the bar supports.

7. The combination with a drum, of a pair of supports carried by the drum shell, an external bar extending across the drum head between said supports, snare-carrying elements carried by said bar, bar supports carried by the first-mentioned supports and separably engaging said bar, and a single means by which said bar supports may be moved toward and from the plane of the drum head, said means comprising two toggles, each connected to one of the first-mentioned supports and to one of the bar supports.

8. The combination with a drum, of a pair of supports carried by the drum shell, one of said supports being laterally displaceable, a bar extending across the drum head between said supports, snare-carrying elements carried by said bar, bar supports carried by the first-mentioned supports and separably engaging said bar, and means by which said bar supports may be moved toward and from the plane of the drum head, said means comprising two toggles each connected to the first-mentioned supports and to the bar supports, and means connecting the two toggles for simultaneous actuation.

9. The combination with a drum, of a pair of supports carried by the drum shell, a bar extending across the drum head between said supports, snare carrying elements carried by said bar, bar supports carried by the first-mentioned supports and separably engaging said bar, and means by which said bar supports may be moved toward and from the plane of the drum head, said means comprising two toggles each connected to the first-mentioned supports and to the bar supports, and means connecting the two toggles for simultaneous actuation.

10. The combination with a drum, of a pair of supports carried by the drum shell, a snare-carrying bar extending across the drum head between said supports, means separably connected to each end of said bar for moving said bar bodily toward and from the drum head, and a shaft journaled in said bar and connecting said means for simultaneous actuation of said means.

11. The combination with a drum, of a pair of supports carried by the drum shell, a snare-carrying bar extending across the drum head between said supports, means connected to each end of said bar for moving said bar bodily toward and from the drum head, and a shaft journaled in said bar and connecting said means for simultaneous actuation of said means.

12. The combination with a drum, of a pair of supports carried by the drum shell, one of said supports being laterally displaceable, a snare-carrying bar extending across the drum head between said supports, bar supports carried by the first-mentioned supports and separably connected to the bar and movable toward and from the plane of the drum head, and a single means by which said bar supports may be simultaneously shifted toward and from the plane of the drum head.

13. The combination with a drum, of a pair of supports carried by the drum shell, one of said supports being laterally displaceable, a snare-carrying bar extending across the drum head between said supports, bar supports carried by the first-mentioned supports and separably connected to the bar and movable toward and from the plane of the drum head, and a single means by which said bar supports may be shifted toward and from the plane of the drum head.

14. The combination with a drum, of a pair of supports carried by the drum shell, one of said supports being laterally displaceable, a snare-carrying bar extending across the drum head between said supports, bar supports carried by the first-mentioned supports and separably connected to the bar and movable toward and from the plane of the drum head, and a single means by which said bar supports may be simultaneously shifted toward and from the plane of the drum head, said means comprising two toggles carried by the first-mentioned supports and connected to the bar supports.

15. The combination with a drum, of a pair of supports carried by the drum shell, one of said supports being laterally displaceable, a snare-carrying bar extending across the drum head between said supports, bar supports carried by the first-mentioned supports and separably connected to the bar and movable toward and from the plane of the drum head, and a single means by which said bar supports may be shifted toward and from the plane of the drum head, said means comprising two toggles carried by the first-mentioned supports and connected to the bar supports.

16. A snare unit comprising a main bar for separable external application to a drum, a shaft extending longitudinally through and journaled in said main bar with its ends exposed for association with supporting means, snare-engaging elements mounted on said bar, and means by which one of said elements may be adjusted toward and from the other.

17. A snare unit comprising a main bar for separable external application to a drum, relatively adjustable snare-engaging elements carried by said main bar, and a rotatable shaft carried by said bar with its ends exposed for association with supporting means.

18. A snare unit comprising a main bar for separable external application to a drum, snare-engaging elements carried by said bar, and a rotatable shaft carried by said bar with its ends exposed for association with supporting means.

In witness whereof, I, CECIL H. STRUPE, have hereunto set my hand at Indianapolis, Indiana, this 12th day of October, A. D. one thousand nine hundred and twenty-three.

CECIL H. STRUPE.